US012096810B2

(12) United States Patent
Gong

(10) Patent No.: US 12,096,810 B2
(45) Date of Patent: Sep. 24, 2024

(54) METHOD OF MANUFACTURING FACE MASK AND NASAL SPRAY INFUSED WITH ANTIVIRAL AND ANTIBACTERIAL ARTEMISIA ARGYI

(71) Applicant: Meiqing Gong, New York, NY (US)

(72) Inventor: Meiqing Gong, New York, NY (US)

( * ) Notice: Subject to any disclaimer, the term of this patent is extended or adjusted under 35 U.S.C. 154(b) by 199 days.

(21) Appl. No.: 17/821,206

(22) Filed: Aug. 22, 2022

(65) Prior Publication Data

US 2022/0395036 A1 Dec. 15, 2022

Related U.S. Application Data

(63) Continuation-in-part of application No. 16/878,573, filed on May 19, 2020, now abandoned.

(51) Int. Cl.

| | |
|---|---|
| ***A41D 13/00*** | (2006.01) |
| ***A41D 13/11*** | (2006.01) |
| *A01N 65/12* | (2009.01) |
| *A01N 65/22* | (2009.01) |
| *A01N 65/36* | (2009.01) |

(52) U.S. Cl.

CPC .......... *A41D 13/1192* (2013.01); *A01N 65/12* (2013.01); *A01N 65/22* (2013.01); *A01N 65/36* (2013.01)

(58) Field of Classification Search

CPC .... A41D 13/1192; A01N 65/12; A01N 65/22; A01N 65/36

See application file for complete search history.

(56) References Cited

U.S. PATENT DOCUMENTS

| | | | | |
|---|---|---|---|---|
| 2008/0038373 A1* | 2/2008 | Belbachir | ............. | A01N 65/22 424/754 |
| 2020/0340145 A1* | 10/2020 | Sunderland | ............. | C08J 3/226 |
| 2020/0375884 A1* | 12/2020 | Hwang | ............... | A61Q 19/007 |
| 2021/0299489 A1* | 9/2021 | Semerly | ............... | A61M 21/02 |

* cited by examiner

*Primary Examiner* — Steven O Douglas
(74) *Attorney, Agent, or Firm* — Michael L. Greenberg, Esq.; Greenberg & Lieberman, LLC

(57) ABSTRACT

A face mask and/or face mask insert infused with specifically aged *Artemisia argyi* pieces or moxa and at least one essential oil, configured to facilitate the purification of air breathed by a user via the filtration of particulates and pathogens, as well as eradication of pathogens via the natural antiviral and antibacterial properties inherent in *Artemisia argyi*. Further, a nasal spray, infused with *Artemisia argyi*, bundled with the face mask and/or face mask insert, is present to enhance the antiviral, antibacterial, and antifungal properties imbued to the face coverings.

8 Claims, 2 Drawing Sheets

100
First, fresh Artemisia Argyi is collected during the Dragon Boat Festival, then left to air dry.

110
Then it is kept it at room temperature for 3 months to 7 years.

120
Then the Artemisia Argyi is crushed into 20 to 100 mesh (0.84 to 0.149 mm) pieces or moxa.

125
Optionally, a percentage of the crushed Artemisia Argyi may be soaked or otherwise introduced to at least one essential oil or natural leaf such as, but not limited to, lemon, tea tree, lavender, rosemary, thyme, chamomile, eucalyptus, or peppermint.

130
Next, the Artemisia Argyi is incubated at 20 to 36 degrees for 1-10 hours with mixing every 1 to 6 hours.

140
Then, the Artemisia Argyi is left to air dry a second time.

150
Steps 100-140 are then repeated 1 to 9 times, the longer the better, forming processed Artemisia Argyi.

160
The processed Artemisia Argyi then kept in an airtight container for 3 months to 6 years.

170
Finally, the effective ingredients are extracted from the processed with 70% to 100% ethanol, then soaked into a bamboo fiber face mask or face mask insert.

METHOD OF MANUFACTURING FACE MASK AND NASAL SPRAY INFUSED WITH ANTIVIRAL AND ANTIBACTERIAL ARTEMISIA ARGYI

CONTINUITY

This application is a continuation-in-part of utility patent application Ser. No. 16/878,573, filed on May 19, 2020, and priority is claimed thereto.

FIELD OF THE PRESENT INVENTION

The present invention relates to the field of health and medical science, and more specifically relates to a face mask apparatus and method of creation thereof configured to apply and employ the antiviral and antibacterial properties of dried *Artemisia argyi* to reduce the viral load present in the air one breathes, as well as to infuse the fibers of the mask with an oil for individual differences and a pleasant scent.

BACKGROUND OF THE PRESENT INVENTION

A vast majority of face masks present on the market are solely configured to filter air breathed by the user. While this is helpful in removing up to 90-99% of pathogens from the air breathed, some viruses and bacteria can still enter the respiratory system and cause illness, even while wearing such a mask. In many cases, the masks do not fit perfectly, and some unfiltered air may enter the space between the mask and the user's face.

The herb *Artemisia argyi* is called "Ai" in Chinese (艾). It is known, in Chinese medicine, to be efficient in the minimizing of bacteria and viruses present, and therefore has many benefits for the health of humans. *A. argyi* can be difficult to discern from similar herbs without DNA confirmation. "Folium *Artemisia argyi* is an important herb in traditional Chinese medicine. It is commonly used in moxibustion, medicine, etc. However, identifying *Artemisia argyi* is difficult because this herb exhibits similar morphological characteristics to closely related species and counterfeits. To verify the applicability of DNA barcoding, ITS2 and psbA-trnH were used to identify *A. argyi* from 15 closely related species and counterfeits. Results indicated that total DNA was easily extracted from all the samples and that both ITS2 and psbA-trnH fragments can be easily amplified. ITS2 was a more ideal barcode than psbA-trnH and ITS2 psbA-trnH to identify *A. argyi* from closely related species and counterfeits on the basis of sequence character, genetic distance, and tree methods. The sequence length was 225 bp for the 56 ITS2 sequences of *A. argyi*, and no variable site was detected. For the ITS2 sequences, *A. capillaris, A. anomala, A. annua, A. igniaria, A. maximowicziana, A. princeps, Dendranthema vestitum*, and D. indicum had single nucleotide polymorphisms (SNPs). The intraspecific Kimura 2-Parameter distance was zero, which is lower than the minimum interspecific distance (0.005). *A. argyi*, the closely related species, and counterfeits, except for *Artemisia maximowicziana* and *Artemisia sieversiana*, were separated into pairs of divergent clusters by using the neighbor joining, maximum parsimony, and maximum likelihood tree methods. Thus, the ITS2 sequence was an ideal barcode to identify *A. argyi* from closely related species and counterfeits to ensure the safe use of this plant." (https://pubmed.ncbi.nlm.nih.gov/27582332/)

If *Artemisia argyi* could be used safely to facilitate the filtering of air, the viral load present in the air would be reduced.

Additionally, if there were a way in which a mask itself could be fashioned to not only filter pathogens, but to also eradicate them in a natural way, the efficacy of mask wearing could be optimized.

Thus, there is a need for a new form of face mask and/or face mask insert for disposition within existing face masks which employs *Artemisia argyi* infused into the fibers of the face mask or face mask insert, configured to employ the antiviral and antibacterial properties of *argyi* to facilitate the eradication of pathogens in the air passing through and/or around the face mask prior to contact with the user. Different scented flavors saturated into the fibers of the mask also provide a pleasant aroma that can alleviate odors from bad breath and make wearing a mask more comfortable.

SUMMARY OF THE PRESENT INVENTION

The present invention is an antibacterial and antiviral mask or mask insert (natural bamboo fiber) with different scented flavors and the methods for making it. By combining *Artemisia argyi* plus ethanol and a natural oil, infused into the bamboo fibers of the face mask or face mask insert, the antiviral and antibacterial properties of the *Artemisia argyi* can be utilized to ensure a cleaner, more pathogen-free air to breathe. Rosemary, lavender, tea tree oil, thyme, chamomile, raspberry, or lemon tree oils may also be used to provide the mask with a pleasant scent, helping to overcome any inherent odor emanating from the mouth/breath of the user. Other natural antibacterial and antiviral materials may be employed with the mask or mask inserts (natural bamboo fiber), chatting spiritual words (include but not limited love, nice, kind etc.) while using. Antibacterial and antiviral effects are best achieved through the mouth and nose which considered the best delivery systems to fight influenza, allergies, and other infectious diseases.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
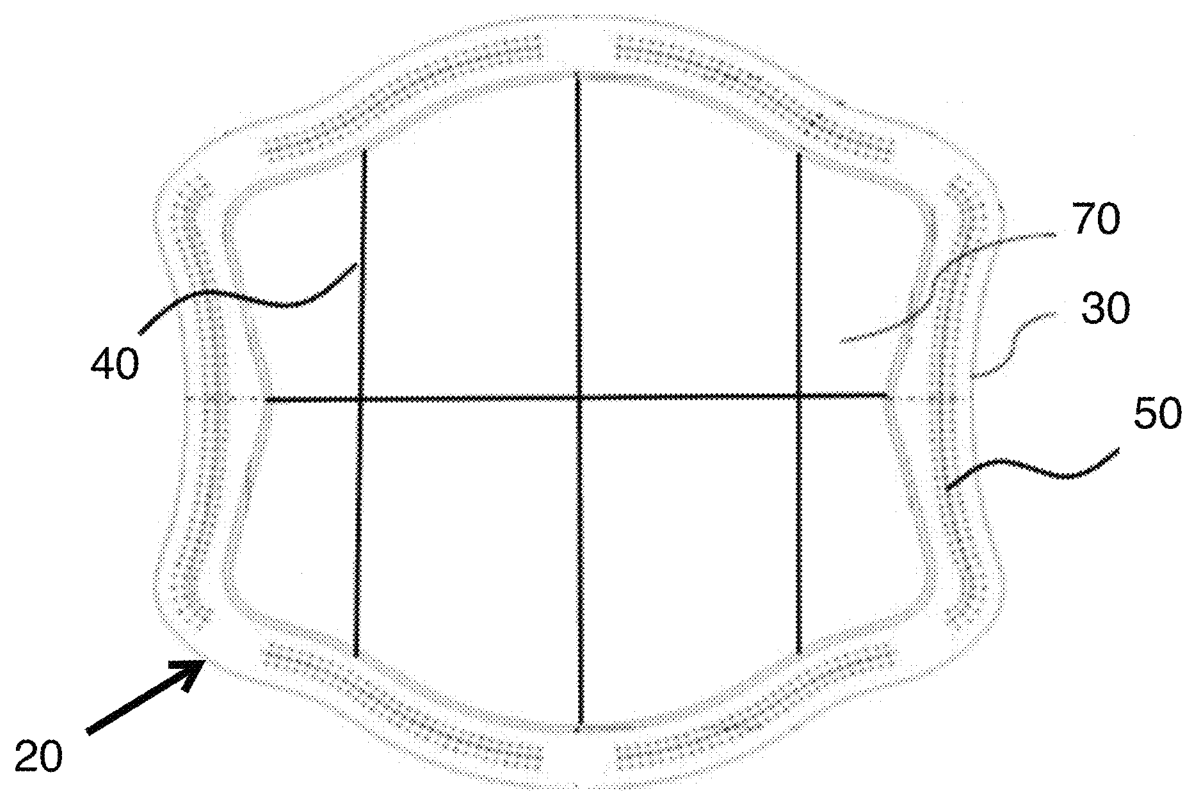
FIG. 1A exhibits a view of the face mask insert embodiment of the present invention equipped with the aged and treated *Artemisia argyi* pieces and essential oils of the present invention.
Figure 1B:
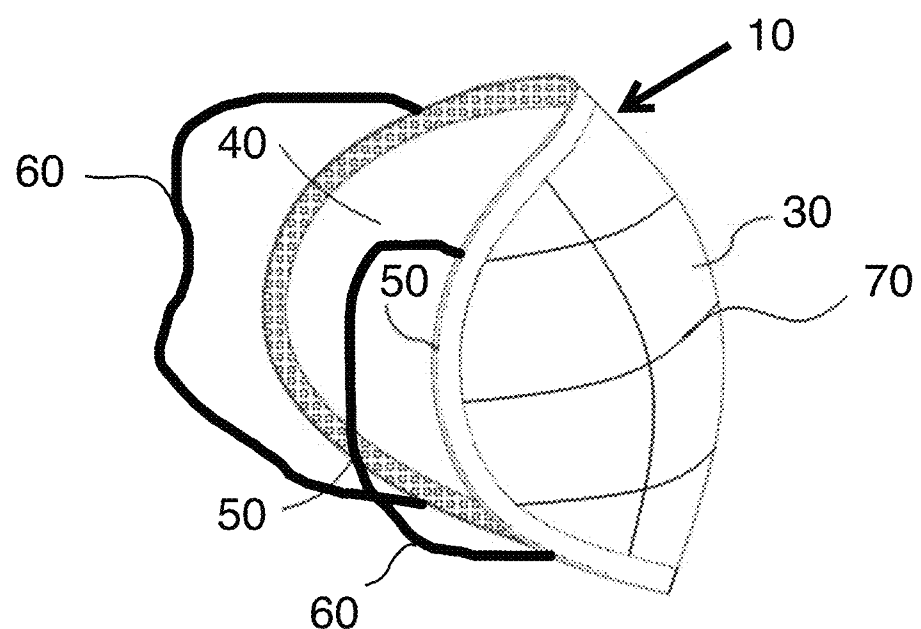
FIG. 1B exhibits a view of the face mask embodiment of the present invention equipped with the aged and treated *Artemisia argyi* and essential oils of the present invention.

The present invention is a novel face mask (10) and face mask insert (20) manufactured with inherent natural antibacterial and antiviral properties to facilitate the reduction of the viral load present in air breathed by the user. Both the face mask (10) embodiment and face mask insert (20) embodiment of the present invention are equipped with an outer layer (30) and an inner layer (40), as well as fabric welds (50) joining the outer layer (30) to the inner layer (40) as shown in FIG. 1A and FIG. 1B. The inner layer (40) and the outer layer (30) are preferably composed of condensed bamboo fiber. Optionally, both the inner layer (40) and outer layer (30) may be, in part, composed with *Artemisia argyi* (70), however in all embodiments of the present invention, the inner layer (40) is equipped with *Artemisia argyi* (70). Only the face mask (10) embodiment of the present invention is equipped with retention straps (60). Preferably, the *Artemisia argyi* (70) (pieces or moxa) is aged, as detailed below, and may be saturated in at least one essential oil when applied to the face mask (10) and/or face mask insert (20), which is then left to air dry.

Figure 2:
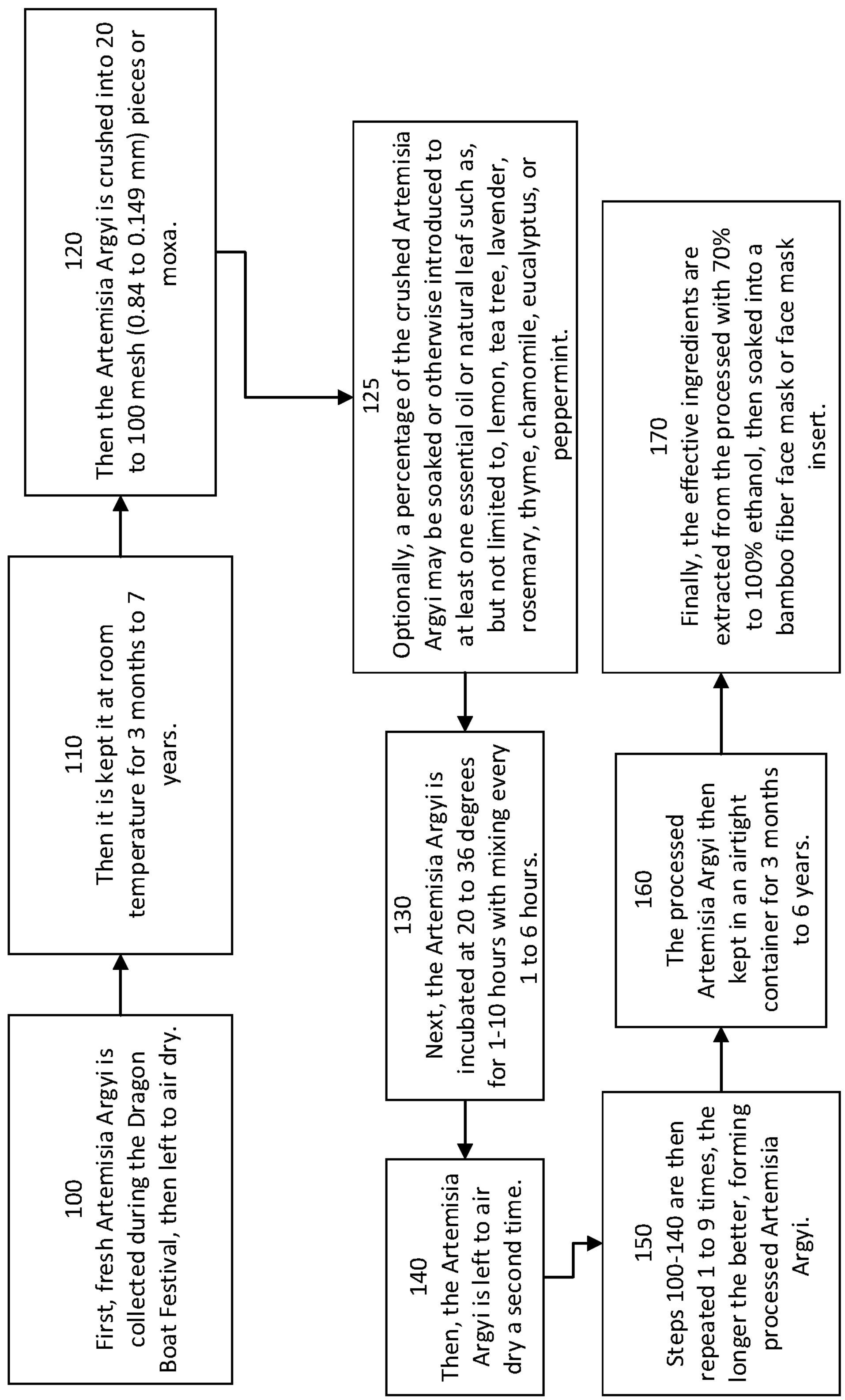
FIG. 2 depicts a flow chart detailing the process of manufacturing and use of the face mask of the present invention.

The process of preparing the *Artemisia argyi* for use in the face mask and face mask insert of the present invention, as shown in FIG. 2, is preferably as follows:

1. First, fresh *Artemisia argyi* is collected during the Dragon Boat Festival, then left to air dry. (100)
2. Then it is kept it at room temperature for 3 months to 7 years. (110)
3. Then the *Artemisia argyi* is crushed into 20 to 100 mesh (0.84 to 0.149 mm) pieces or moxa. (120) Optionally, a percentage of the crushed *Artemisia argyi* may be soaked or otherwise introduced to at least one essential oil or dried natural leaf such as, but not limited to, lemon, tea tree, lavender, rosemary, thyme, chamomile, eucalyptus, or peppermint. (125)
4. Next, the *Artemisia argyi* is incubated at 20 to 36 degrees for 1-10 hours with mixing every 1 to 6 hours. (130)
5. Then, the *Artemisia argyi* is left to air dry a second time. (140)
6. Steps 1-6 are then repeated 1 to 9 times, the longer the better, forming processed *Artemisia argyi*. (150)
7. The processed *Artemisia argyi* then kept in an airtight container for 3 months to 6 years. (160)
8. Finally, the effective ingredients are extracted from the processed with 70% to 100% ethanol, then soaked into a bamboo fiber face mask or face mask insert. (170)

Some embodiments of the present invention may be augmented with a nasal spray similarly infused with the *Artemisia argyi* detailed previously. In such instances, the *Artemisia argyi* is prepared similarly, and then infused into ethanol, potentially including propylene glycol, to facilitate the creation of an infused liquid equipped with the antiviral and antibacterial properties inherent in *Artemisia argyi*. The infused liquid is then disposed within a dispenser configured to spray the infused liquid in the form of an aerosol which is safe for inhalation. The infused liquid may also be added directly to the face mask when sprayed in aerosol form, helping to refresh the antibacterial, antifungal, and antiviral properties of the face mask of the present invention.

It should be noted that conscious thought and/or verbal statements inducing positivity are known to be beneficial to the use of all embodiments of the present invention by a user.

Alternately, a percentage of the dried *Artemisia argyi* (1-100%) may be introduced to at least one of the following natural scents/oils: fresh rosemary leaf (0-99%), fresh Lavender (cut into 1 inch pieces) (0-99%), fresh Tea tree leaves (0-99%), fresh Lemon (cut into 1 inch pieces) (0-99%), fresh Thyme (cut into 1 inch pieces) (0-99%), fresh Chamomile (0-99%), fresh Eucalyptus leaf or oil (leaves cut into 1 inch pieces) (0-99%), or fresh Peppermint leaves or oil (0-99%).

Further, it should be understood that the face mask (10) and/or face mask insert (20) of the present invention may be manufactured in a variety of shapes, including squares and rectangles per conventional masks.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method of treating a face mask to have inherent antiviral, antibacterial, and antifungal properties comprising:

collecting fresh *Artemisia argyi;* leaving the fresh *Artemisia argyi* to air dry, forming dried *Artemisia argyi;* keeping the dried *Artemisia argyi* at room temperature for three months to seven years, forming dried and aged *Artemisia argyi;* crushing the dried and aged *Artemisia argyi* into 20 to 100 mesh pieces, forming crushed *Artemisia argyi;* introducing the crushed *Artemisia argyi* to at least one of the following: a natural herb, and an essential oil;

incubating the crushed *Artemisia argyi* at 20 to 36 degrees for 1 to 10 hours, mixing the crushed *Artemisia argyi* every one to six hours, forming incubated *Artemisia argyi;* leaving the incubated *Artemisia argyi* to air dry, forming processed *Artemisia argyi;* keeping the processed *Artemisia argyi* in an airtight container for three months to six years;

extracting concentrated *Artemisia argyi* from the processed *Artemisia argyi* with ethanol; and soaking the face mask in the concentrated *Artemisia argyi*, forming a treated face mask.

2. The method of claim 1, wherein the essential oil is at least one of the following: lemon, tea tree, lavender, rosemary, thyme, chamomile, eucalyptus, or peppermint.

3. The method of claim 1, wherein the natural herb is at least one of the following: lemon, tea tree, lavender, rosemary, thyme, chamomile, eucalyptus, or peppermint.

4. The method of claim 1, wherein the face mask is equipped with a face mask insert which is treated with the concentrated *Artemisia argyi.*

5. The method of claim 2, wherein the face mask is equipped with a face mask insert which is treated with the concentrated *Artemisia argyi.*

6. The method of claim 3, wherein the face mask is equipped with a face mask insert which is treated with the concentrated *Artemisia argyi.*

7. The method of claim 3, further comprising:

spraying the face mask with an aerosol spray, the spray infused with the concentrated *Artemisia argyi* to refresh the antiviral, antibacterial, and antifungal properties of the face mask.

8. The method of claim 3, further comprising:

infusing an aerosol spray with the concentrated *Artemisia argyi;* wherein the aerosol spray is safe for human inhalation; and spraying the aerosol spray into the nostrils.

* * * * *